United States Patent
Wood

[19]

[11] Patent Number: 6,105,758
[45] Date of Patent: Aug. 22, 2000

[54] OPEN WEB REINFORCING

[75] Inventor: Peter James Wood, Tayside, United Kingdom

[73] Assignee: Reekie Manufacturing Limited, Tayside, United Kingdom

[21] Appl. No.: 09/297,226

[22] PCT Filed: Oct. 22, 1997

[86] PCT No.: PCT/GB97/02913

§ 371 Date: Apr. 23, 1999

§ 102(e) Date: Apr. 23, 1999

[87] PCT Pub. No.: WO98/17553

PCT Pub. Date: Apr. 30, 1998

[30] Foreign Application Priority Data

Oct. 23, 1996 [GB] United Kingdom .................. 9622077

[51] Int. Cl.[7] .................................................. B65G 15/54
[52] U.S. Cl. ............................................................ 198/848
[58] Field of Search ................................... 198/847, 848, 198/850

[56] References Cited

U.S. PATENT DOCUMENTS

| 2,255,364 | 9/1941 | Pink | 198/848 |
| 5,168,981 | 12/1992 | Ruff | 198/850 |
| 5,671,839 | 9/1997 | Sanderson | 198/848 |
| 5,692,598 | 12/1997 | Röhrs | 198/848 |

FOREIGN PATENT DOCUMENTS

| 340514 | 11/1989 | European Pat. Off. . |
| 2421366 | 11/1975 | Germany . |
| 3903921 | 8/1990 | Germany . |
| 94/21108 | 9/1994 | WIPO . |

*Primary Examiner*—James R. Bidwell
*Attorney, Agent, or Firm*—Young & Basile, P.C.

[57] ABSTRACT

The present invention provides an open web (10) suitable for use in conveying bodies such as root crops and stones and clods, comprising at least two elongate belts (11) extending parallel to each other in spaced apart relation, and a plurality of rods (12) mounted in parallel spaced apart relation across the belts (11). Connecting portions (13) of the rods (12) are enclosed and embedded within the body of the belts (11), and tensile reinforcing (20) extend longitudinally in the body of at least one of the belts (11) so as to provide a tensile load support therefor. According to this invention, a reinforcing link (32,34,36,38) is substantially embedded in at least one belt (11) having tensile reinforcing (20) embedded therein, and is formed and arranged so as to link at least one of the rod connecting portions (13) to the tensile reinforcing (20) whereby the tensile reinforcing (20) and the at least one rod connecting portion (13) linked thereto, are restrained or retained against movement away from one another.

16 Claims, 3 Drawing Sheets

OPEN WEB REINFORCING

The present invention relates to open webs suitable for use in conveying bodies such as root crops and stones and clods. Such open webs are used in agricultural machinery such as, for example, harvesters, graders and separators. In particular, the invention relates to improvements in the reinforcement of such open webs.

Conventional open webs generally comprise a plurality of rods or bars mounted in parallel spaced apart relation across two or more parallel spaced apart belts, connecting portions of the rods being secured to the belts. Each belt has two ends which are connected to each other so as to form an endless belt which is driven by a drive means, such as drive rollers, of the machinery in which the open web is used.

Our International (PCT) Patent Application No. PCT/GB94/00520, Publication No. WO94/21108 describes an improved open web in which the connecting portions of the rods of the web are embedded within, and bonded to, the elongate belts. This provides an inherently strong and reliable securement of the ends of the rods to the elongate belts for withstanding the rigours of everyday use of the open web in an agricultural environment. To strengthen the elongate belts against the severe tensile strains to which the belts are often subjected during use of the open web, suitable reinforcement is often provided in the form of tapes, strips or cords of tensile material which are embedded within the elongate belts, running along the length of the belts.

As well as tensile strain exerted along their lengths, the elongate belts are also often subjected to components of strain acting generally perpendicularly to the plane of the belts, between the body of the belts and the connecting portions of the rods embedded therein, especially during bending of the belts, for example, where the belts are bent round drive rollers. Such strains tend to pull the rod connecting portions away from the tapes, strips or cords of tensile material and/or vice versa, leading to breakage of the belts, and/or causing gaps to be created between the connecting portions of the rods and the surrounding belt into which gaps soil and/or other debris can accumulate, leading to environmental degradation and ultimately breakage of the belt, tapes, strips or cord. Such breakages are a major problem as they result in substantial down-time of the machinery while the open web is repaired or replaced at significant cost in terms of labour and lost machine usage time.

One way of attempting to overcome these problems is to loop or tie the reinforcing tapes or cords around the connecting portions of the rods. However, this is extremely time consuming and labour intensive during the manufacturing process of the open web, and is also a somewhat error prone operation.

It is an object of the present invention to avoid or minimise one or more of the foregoing disadvantages.

According to a first aspect of the invention an open web suitable for use in conveying bodies such as root crops and stones and clods comprises at least two elongate belts extending parallel to each other in substantially spaced apart relation, a plurality of rods mounted in parallel spaced apart relation across said belts with connecting portions of said rods being substantially enclosed and embedded within the body of said belts, and tensile reinforcing means extending longitudinally in the body of at least one of said belts so as to provide a tensile load support therefor, wherein reinforcing link means is substantially embedded in at least one said belt having tensile reinforcing means embedded therein, said reinforcing link means being formed and arranged so as to link at least one of said rod connecting portions to said tensile reinforcing means whereby said tensile reinforcing means and said at least one rod connecting portion linked thereto are substantially restrained or retained against movement away from one another.

One advantage of the present invention is that by linking one or more of the rod connecting portions to the tensile reinforcing means the open web is strengthened against forces or strains which tend to tear these rods out of the belt(s). The more rod connecting portions which are linked to the tensile reinforcing means, the more the open web is strengthened in the areas of these rod connecting portions, though normally it would be preferable for all the rod connecting portions to be so secured.

Another advantage of the invention may arise during the manufacture of the open web. Where the belts are moulded around the rod connecting portions during manufacture, by linking the tensile reinforcing means to said at least one rod connecting portion the reinforcing link means tends to hold the tensile reinforcing means in place, at least to some extent, during moulding of the belt material around the rod connecting portions and the tensile reinforcing means. This tends to prevent deformed or weak regions being formed in the belt due to displacement of the tensile reinforcing means and/or the rods during the moulding stage of the manufacture process. In general, the greater the number of rod connecting portions linked to the tensile reinforcing means, the greater the benefit in this regard during the manufacturing process.

Preferably, the reinforcing link means captively links said at least one rod connecting portions to the tensile reinforcing means. Said reinforcing link means may comprise at least one reinforcing link. Preferably, said reinforcing means comprises a plurality of reinforcing links, each of said links being formed and arranged for captively linking a respective rod connecting portion to said tensile reinforcing means. Advantageously, a plurality of said reinforcing links are provided in each of said two elongate belts.

The or each said reinforcing link may be formed and arranged for extending at least partly around a portion of said tensile reinforcing means. Preferably, the or each said reinforcing link is formed and arranged to extend at least partly around a connecting portion of a respective one of the rods. Alternatively, said reinforcing link means may comprise at least one link which is formed and arranged for linking a plurality of said rod connecting portions to said tensile reinforcing means. For example, said reinforcing means may comprise a plurality of links, each said link being formed and arranged for linking two adjacent rod connecting portions to the tensile reinforcing means.

The or each said reinforcing link may be in the form of a clip or staple-like element which is positioned over a connecting portion of a rod and fastened to said tensile reinforcing means. Alternatively, said reinforcing link(s) may be generally in for form of a twisted figure-of-eight which is formed and arranged to link said rod connecting portion(s) to the tensile reinforcing means.

Alternatively, and preferably, the or each said reinforcing link comprises at least one loop or aperture through which a respective rod connecting portion extends so that a portion of said tensile reinforcing means is sandwiched, preferably relatively tightly, between said respective rod connecting portion and a portion of said reinforcing link.

The or each said reinforcing link may comprise a base portion, and at least one, preferably at least two, generally upstanding, rod engagement portion(s) each provided with an aperture or loop formed to receive therethrough a rod connecting portion. Each link is preferably disposed in the open web such that the base portion of the link is located below a portion of the tensile reinforcing means and a rod connecting portion extends through apertures or loops in the rod engagement portion(s) of the link so that the tensile reinforcing means is sandwiched between the reinforcing link base portion and the rod connecting portion.

Advantageously the reinforcing link has a said rod engagement portion at each end portion of the base portion so that the link effectively loops under the tensile reinforcing means so that a portion of the tensile reinforcing means is captively encompassed between said rod connecting portion and the base and end portions of the link, so that the rod connecting portion and the tensile reinforcing means are securely linked together and are thus substantially prevented from moving away from each other during use of the open web. It will be appreciated that where the upstanding rod engagement portions are provided at the end portions of the link means, only, then they may be used with more or less any kind of tensile reinforcing means including those in which the tensile reinforcing means is substantially continuous and impenetrable across the width thereof. In other cases, for example where the tensile reinforcing means comprises a plurality of spaced apart and/or separate strands or elements whereby the reinforcing means can be substantially penetrated by a said rod engagement portion, then one or more rod engagement portions intermediate the link end portions may be used.

Lower portions of each of said two generally upstanding end portions may be tapered inwards to form a narrowed neck portion adjacent to said base portion. The base portion may be generally elongate in which case the width of the base portion of each link is preferably also tapered, from each of the upstanding end portions to approximately halfway along the length of the link, such that the width of the elongate base portion of the link is narrowest approximately halfway along its length. One advantage of each of these measures is in minimising any restriction on the flexibility of the belts between neighbouring rods due to the presence of the or each link element embedded therein. Advantageously each link element is configured to provide a relatively tight fit about the tensile reinforcing means and the respective rod connecting portion whereby said portion of the tensile reinforcing means is sandwiched relatively tightly therebetween.

A respective said link element may be provided for each rod connecting portion in the open web. Alternatively, only some of the rod connecting portions may be provided with a respective link element. For example, every alternate one of the rod connecting portions may be provided with a respective link element.

Each link element may be pressed out of steel e.g. stainless steel. Alternatively, and preferably, each link element comprises a single wire or strand of steel, preferably resilient steel, sometimes referred to a "spring steel", which is formed into a desired shape. Advantageously the link has a form which requires only a small number of bends to form from an initial length or blank.

Said tensile reinforcing means may be in the form of one or more of strips, tapes and cords of tensile material. For example, tapes of tensile fabric material and/or steel e.g. stainless steel cords may be used.

According to a second aspect of the invention a method of manufacturing an open web suitable for use in conveying and separating bodies such as root crops and stones and clods comprises the steps of:

providing a plurality of elongate rods; providing at least one elongate tensile reinforcing means; linking at least one of said plurality of elongate rods to at least one said tensile reinforcing means using reinforcing link means, so that said at least one tensile reinforcing means and said at least one rod are substantially retained against movement away from one another;

supporting said plurality of rods so as to be in spaced apart parallel relation in an elongate array and arranging said at least one elongate tensile reinforcing means so as to extend transversely of said rods; and moulding at least two flexible elongate belts so as to extend in parallel spaced apart relation transversely of the rods and around connecting portions of the rods so as to embed said connecting portions of all the rods, said reinforcing link means and said at least one tensile reinforcing means substantially within said belts.

Preferably, there are provided at least two elongate tensile reinforcing means and said reinforcing link means is provided in the form of a plurality of pairs of reinforcing link elements, each link in a said pair being positioned so as to sandwich a portion of said tensile reinforcing means between a respective one of two opposing rod connecting portions of one of said plurality of rods, prior to the moulding step taking place.

Preferably, the method according to this second aspect of the invention includes the steps of:

supporting a plurality of reinforcing link elements about respective portions of said at least one elongate tensile reinforcing means;

threading the connecting portions of at least some of said plurality of elongate rods through corresponding apertures or loops in said reinforcing link elements so as to sandwich said respective portions of the tensile reinforcing means between parts of the reinforcing link elements and the connecting portions of said rods, whereby said respective portions of the tensile reinforcing means are substantially held in position relative to said rod connecting portions; moulding said at least two flexible elongate belts so as to extend in parallel spaced apart relation transversely of the rods and around connecting portions of the rods, said reinforcing link elements and said at least one tensile reinforcing means, so as to substantially embed said tensile reinforcing means, said reinforcing link elements and said connecting portions of the rods within said belts.

This method of manufacture of the open web has an advantage over the conventional open web manufacturing methods in that the tensile reinforcing means is, at least to some extent, held in place relative to the rod connecting portions of at least some of the rods during the moulding process thereby minimising relative displacement thereof upon introduction of the rubber or other polymeric material into the mould for moulding around the rod connecting portions and tensile reinforcing means to form the open web.

It will be understood that the present invention may be used with various form of connection between the belts and the rod connecting portions including simply disposing the rod ends through holes in the belts and retaining them by simple mechanical fixings such as retaining pins or the like secured to projecting ends on the outside edge of the belt. Alternatively the rod ends could be push-fit inserted into undersized holes in the belts for retention therein by a compression fit. Desirably though the rod connecting portion surfaces are bonded to the belt hole walls, for example by suitable adhesives, vulcanizing-in, or the like. Most preferably though the rod connecting portions are moulded-in into the belts as described in our earlier patent publication No. WO94/21108.

Where the rod connecting portions are not moulded-in into the belts, the reinforcing link means may be moulded-in into the belts prior to insertion of the rod connecting portions into the belts. Alternatively, at least a portion of each reinforcing link means may be inserted into a respective aperture provided in a respective said belt, between or through the tensile reinforcing means, prior to insertion of the rods into the belts. Preferably, where the rod connecting portions are moulded-in into the belts the reinforcing link means are assembled to the rods and the tensile reinforcing means prior to the moulding of the belts therearound.

According to a third aspect of the invention we provide an agricultural machine for at least one of conveying, grading, separating and cleaning of farm produce which machine includes at least one open web according to the first aspect of the invention. The agricultural machine may, for example, be a potato harvester.

Preferred embodiments of the invention will now be described by way of example only and with reference to the accompanying drawings in which.

Figure 4:
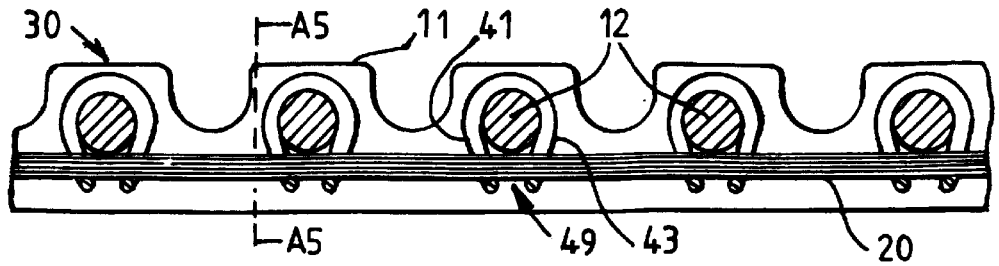
Figure 5:
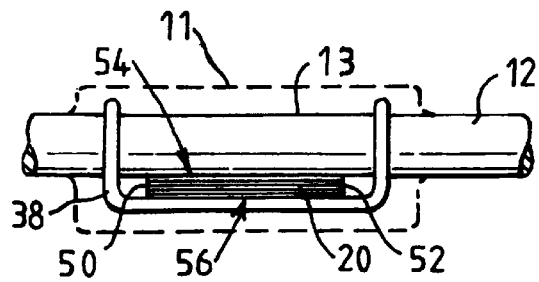
Figure 6:
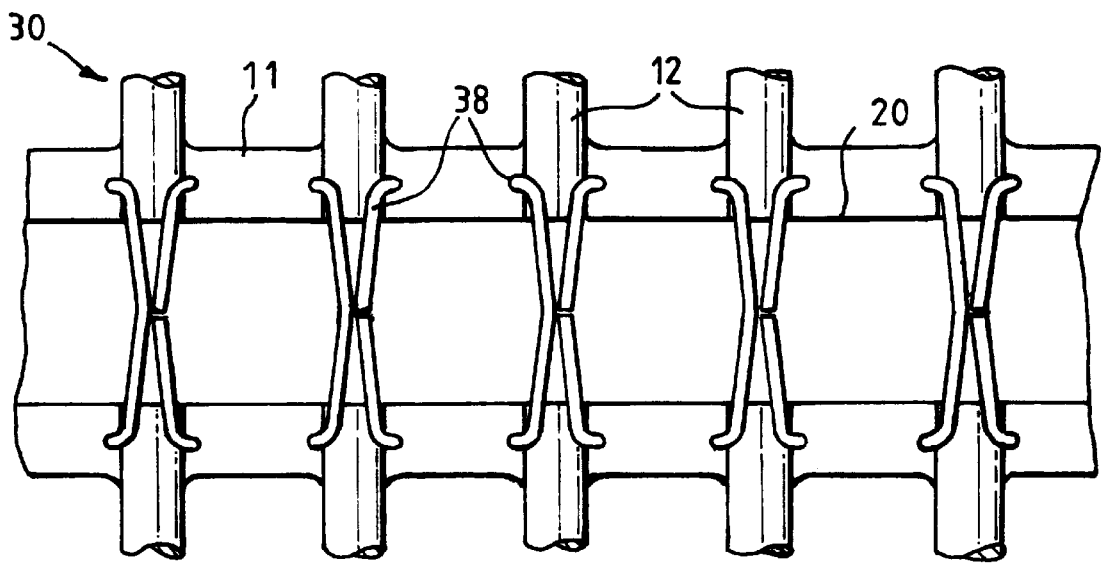
Figure 7:
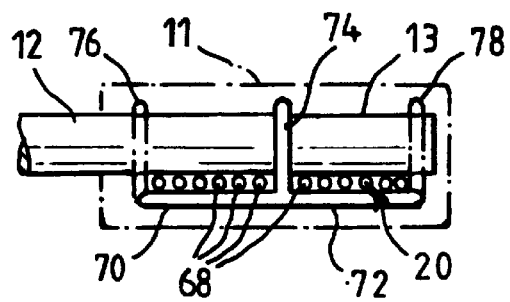

FIGS. 3(i) to (iv) show four examples of reinforcing links for use in an open web according to the present invention;

FIG. 4 is a cross-sectional side elevation of part of an open web in accordance with the invention;

FIG. 5 is a sectional view of a portion of the open web of FIG. 4 taken along the line A5-A5 and prior to moulding of a belt therearound, the moulded belt being indicated in hashed outline;

FIG. 6 is a plan view of the underside of part of an open web according to the present invention, with an outer layer of belt material cut away to reveal embedded components of the open web;

FIG. 7 is a view corresponding generally to that of FIG. 5, showing modified embodiments of the invention.

Figure 8:
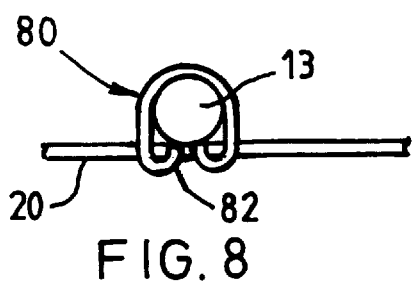
Figure 9:
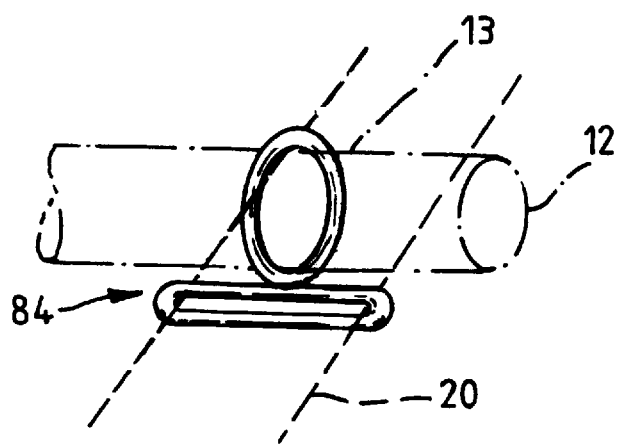
Figure 10:
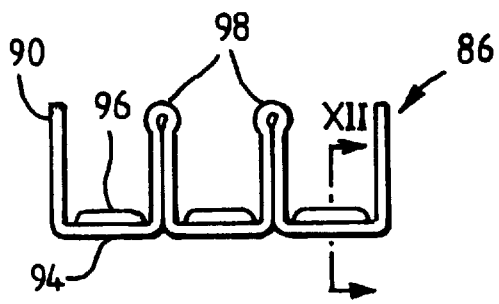
Figure 11:
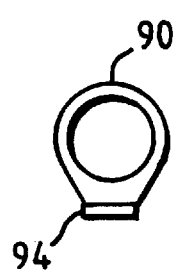
Figure 12:
Figure 13:
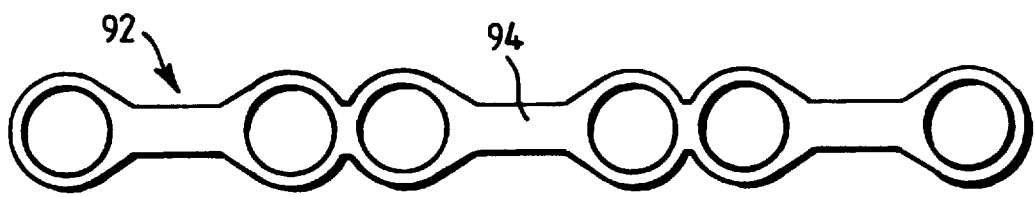

FIG. 8 is a detail side view of a staple—form link element linking a rod and tensile reinforcing means;

FIG. 9 is a perspective view of a figure-of-eight type link element;

FIG. 10 is a front elevation of another embodiment of link element with multiple rod engagement portions;

FIGS. 11 and 12 are respectively an end view and a vertical section of the embodiment of FIG. 10; and FIG. 13 is a plan view of a blank from which the embodiment of FIGS. 10 to 12 is formed.

Figure 1:
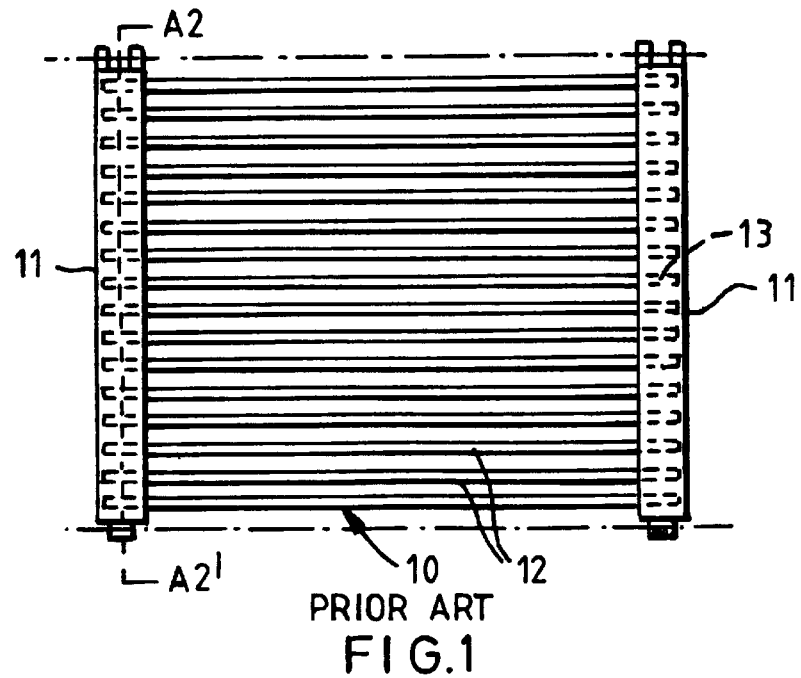
FIG. 1 is a plan view of part of a known type of open web.

FIG. 1 shows a known type of open web 10 suitable for use in a potato harvester (not shown) which is used, for example, in the grading and/or separating of potatoes or other such root crops. The open web 10 is described in our International Patent Application, Publication No. WO94/21108, and comprises two elongate belts 11 extending parallel to each other and a large plurality of elongate rods 12 mounted in regular parallel spaced apart relation.

The belts are usually made of an elastomeric material e.g. polyurethane and connecting portions 13 of the rods 12 are secured to the belts by being embedded in the belts and bonded thereto. The ends of each belt 11 are connected to each other so that the belts form endless belts which are driven by a plurality of drive rollers (not shown) in use of the open web in the potato harvester.

Figure 2:
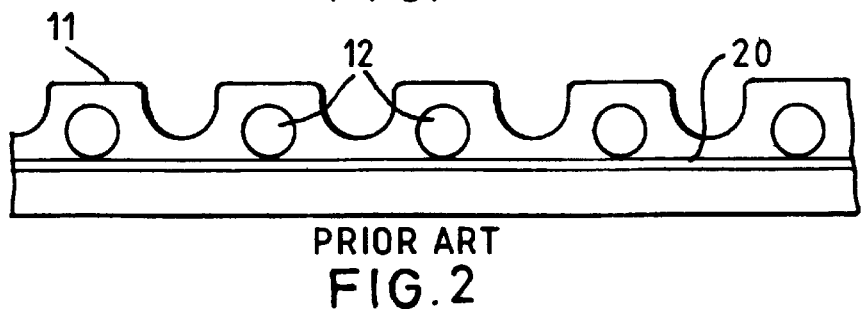
FIG. 2 is a cross-sectional side elevation of part of the open web of FIG. 1, taken along the line A2-A2' of FIG. 1, showing a tensile reinforcing layer embedded therein.

As shown in FIG. 2, which is a cross-sectional side elevation through one of the belts of the open web of FIG. 1, each belt 11 is reinforced by tensile reinforcing material 20 in the form of tapes and/or cords of tensile material e.g. webbing tapes, steel cords or mesh, which are also embedded in the belts and extend longitudinally therein so as to provide a tensile load support for each belt. In further possible embodiments (not shown) one or more additional belts parallel to, and spaced apart from, the two belts 11 may be incorporated in the open web between the two belts 11. These additional belt(s) are secured to portions of the rods located between the rod ends and may provide extra support to the rods 12 and/or enable additional drive to be imparted to the open web 10.

Figure 3:
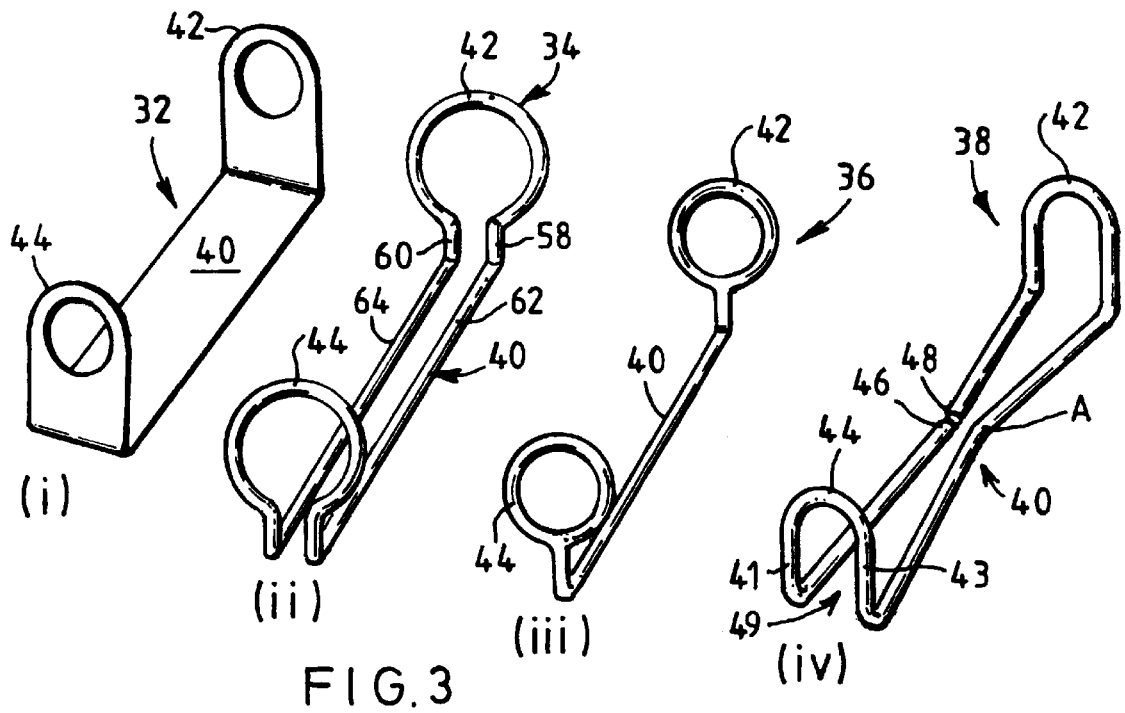

FIGS. 3(i), (ii), (iii), and (iv) show four alternative types of reinforcing link element 32,34,36,38 for use in an improved open web according to the invention and FIGS. 4,5 and 6 show one belt 11 of such an improved open web 30 incorporating a plurality of link elements as shown in FIG. 3(iv), like parts to those in FIGS. 1 and 2 being indicated by like reference numerals. The or each additional belt 11 and the various items embedded therein, is similar to that shown in FIGS. 4,5 and 6. FIGS. 5 and 6 show a middle belt secured to connecting portions 13 of the rods 12 located between the ends of the rods. However, in other possible embodiments there may only be two belts 11 secured to end portions of the rods 12 (as in FIG. 1), or link elements such as those shown in FIGS. 3 and 4 may be incorporated in only one or some of the belts 11 of the open web.

As illustrated in FIGS. 3(i)–(iv), each link element 32,34, 36,38 essentially comprises a generally elongate base portion 40 and two upstanding end portions 42,44 which function as rod engagement portions. In the preferred embodiment of FIG. 3(iv), the link element 38 is made from a single wire made of spring steel of approximately 2.3 mm diameter which is formed into the required shape. As shown in FIG. 3(iv), the wire is bent to form a generally U-shaped loop at each end of the link element 38, which loops form the upstanding end portions 42,44. Between these end loops the wire forms the base portion 40 of the link element.

Thus, as shown clearly in FIG. 4, an end view of the link 38 shows the upstanding end portions 42,44 are of generally horse-shoe shaped configuration, lower end portions 41,43 of each loop 42,44 tapering towards each other to form a narrowed neck portion 49 of the loop 42,44, adjoining the base portion 40. This arrangement has the advantage of minimising or substantially avoiding any loss of flexibility (due to the presence of the link 38) in so-called "flexing zones" of the belt, adjacent the rod connecting portion 13 embedded therein. As the base portion 40 of each link 38 is tapered inwardly from the lower end portions 41,43 of the loops 42,44 this also tends to minimise or substantially avoid any loss of flexibility in the belt 11 in the region of the links 38 and the rod connecting portions 13.

The free ends 46,48 of the wire may be welded together for extra strength, if desired, or left free as shown in FIG. 3(iv). The size (i.e. diameter) of the loops forming the upstanding end portions 42,44 are designed to be sufficiently large to accommodate therethrough one of the rods 12 of the open web.

FIGS. 4 ,5 and 6 show how a plurality of reinforcing link elements 38 according to FIG. 3(iv) are incorporated in the open web 30 of the invention. Each link element 38 is disposed about a respective one of the belts 11 so that the base portion 40 is located just below the tensile reinforcing material 20 embedded in the belt 11 and the upstanding end portions 42,44 protrude around opposing edges 50,52 of the tensile material 20 and above an upper side 54 of the same, as shown clearly in FIGS. 4 and 5. The link elements 38 are disposed in equidistant spaced apart relation along the length of the tensile reinforcing material 20.

A respective connecting portion of a respective one of the rods is threaded through each of the loops in the upstanding end portions 42,44 of each link element 38. In this manner each rod connecting portion is linked in a captive manner to the tensile reinforcing material so as to substantially prevent the two from moving away from one another. In the embodiment illustrated in these Figs., the link elements 38 are configured to fit relatively tightly about the rod connecting portions 13 and the tensile reinforcing material 20 so that the base portion 40 of the link element is in frictional contact with the underside 56 of the tensile reinforcing material and with the outer surface of the rod connecting portion 13. Thus, the tensile reinforcing material 20 is sandwiched tightly between the link elements 38 and the rod connecting portions 13. In other possible embodiments (not shown) the fit need not be so tight in order to achieve, at least to some extent, the advantages of the invention. Moreover, the rod connecting portions need not be in direct contact with the tensile reinforcing material 20, as shown in FIG. 4, but could be slightly separated therefrom by a portion of the belt material.

FIGS. 3(*i*)–(*iii*) show three other possible types of link element configuration. In FIG. 3(*i*), the link element 32 is formed in stainless steel and has a generally planar base portion 40 and two upstanding flanges 42,44, each of which has a circular aperture therein for receiving a connecting portion 13 of a rod 12. The link element is manufactured by pressing or cutting the desired shape from steel plate and forming, generally by folding or bending, the component to the shape shown in FIG. 3(*i*).

In FIG. 3(*ii*) the link element 34 is formed from a spring steel wire which is formed into a generally circular loop 42,44 at each end of the link element for receiving a rod connecting portion 13 therethrough. Each loop 42,44 comprises a narrow neck portion where two parallel wire portions 58,60 extend generally vertically downwards for a short length before turning at a right-angle and extending towards the other one of the loops, the base portion 40 thus being formed by two parallel wire portions 62,64. The ends of the wire can be welded together (as shown in FIG. 3(*ii*), or can be left free, as in the link 38 of FIG. 3(*iv*).

FIG. 3(*iii*) shows a link element 36 of similar design to that of FIG. 3(*ii*) but with only one wire portion forming the base portion 40 of the link. Again, the link is made from a spring steel wire which is formed into two circular loops 42,44 at the ends of the link, this time with the free ends of the wire being welded back onto the wire itself so as that the loops 42,44 are closed loops.

The link element 38 of FIG. 3(*iv*) is the preferred one of the four links designs illustrated in FIGS. 3(*i*)–(*iv*) as it is the simplest to manufacture: the length of wire can be cut to the appropriate length and/or bent into the illustrated shape using commonly available Computer Numerical Control (CNC) machinery.

One possible method of manufacturing the open web according to the invention involves positioning a desired number of the reinforcing link elements about respective, spaced apart portions of the tensile reinforcing material 20 and threading at least some of the rods 12 therethrough above the tensile reinforcing material, so as to sandwich the latter between the rod connecting portions and the base portions 40 of the respective link elements, prior to moulding the belts 11 about the rods and the tensile reinforcing material. In the preferred embodiment each rod connecting portion of every rod is linked to the tensile reinforcing material by a respective link element. It is envisaged, however, that in some instances only nominated ones of the rod connecting portions will be provided with a link element. For example, where an additional centre belt (not shown) is provided substantially midway along the length of the rods, running parallel to the two outer belts 11, the rod connecting portions embedded in this centre belt may not be link to the tensile reinforcing material 20.

Other methods of manufacture are also possible. For example, the link elements could be first mounted on the rods which could then be held in suitable clamping means while the tensile material 20 is pulled through between each link element and its respective rod connecting portion 13.

Each reinforcing link element could alternatively be designed for linking more than one rod connecting portion, for example two adjacent rod connecting portions 13, to the tensile reinforcing material(s). This is, though, likely to reduce the flexibility of the belt in the regions where such link elements are incorporated, with link elements capable of spanning more than two rod connecting portions being impractical for most intents and purposes of the open web, unless a certain amount of inflexibility can be accepted.

FIG. 7 illustrates some further possible embodiments of the invention. FIG. 7 is a view similar to that of FIG. 5, prior to moulding of the belt 11 around a rod connecting portion 13, a reinforcing link 70 and tensile reinforcing material 20 in the form of separate elongate cords 68. This view shows a belt 11 which is secured to rod connecting portions 13 at the ends of the rods 12. Links 60 like that shown in FIG. 7 could, of course, be used in one or more further belts 11 incorporated in the open web.

The link 70, in FIG. 7, comprises a base portion 72 and one central upstanding rod engagement portion 74 which is in the form of a loop, or is provided with an aperture, through which the rod connecting portion 13 extends, as shown. The base portion 72 comprises a generally planar element which extends below the tensile cords 68, so as to sandwich these cords between the rod connecting portion 13 and the link base portion 72, with the central upstanding rod engagement portion 74 extending up between two of the cords 68, as shown. In a further embodiment, illustrated in hashed outline, the link 70 comprises one, preferably two, further upstanding rod engagement portions 76,78 which are located adjacent the outer ones of the tensile cords 68 so that the link 70 also loops round all the cords 68 in the manner of the links 32, 34, 36, 38 of FIGS. 3(I)–(*iv*).

In other possible embodiments of the invention the rod connecting portions are not moulded-in into the belts 11 but are secured therein after the belts have been moulded, by insertion into respective apertures or bores formed therefor in the belts 11. In this case the links 32,34,36,38 or 60 are assembled about the rod connecting portions 13 and tensile reinforcing means prior to moulding of the belts. Alternatively, suitable apertures are provided in the moulded belts 11 into which the links, or at least portions thereof, are inserted so as to extend into respective apertures or bores provided in the belts 11 for receiving the rods 12, into which apertures or bores the rod connecting portions 13 are subsequently inserted.

It will be appreciated that various modifications to the above-described embodiments are possible without departing from the scope of the invention. For example, the link elements may take other possible forms which are similarly effective in restraining the tensile reinforcing material 20 and the rod connecting portions 13 from moving away from one another. The link elements may, for example be in the form of clips or staples 80 which fit over the rod connecting portions 13 and are fastened to the tensile reinforcing tapes or cords 20, for example by passing the staple ends 82 through tensile fabric tapes 20, or hooking round steel cords or mesh reinforcement.

Alternatively, as shown in FIG. 9, a figure-of-eight-shaped link element 84 (e.g. formed from a twisted loop, or from two interlocking ring elements) could be disposed around the rod connecting portions 13 and the tensile reinforcing tapes or cords etc. 20 so as to link the two together.

FIG. 10 shows another embodiment of link element 86 somewhat similar to that of FIG. 7 with two central rod engagement portions 98 between two end ones 90. This link element 86 is manufactured from a one-piece blank 92 pressed or punched out of a steel strip and shown in FIG. 13. The blank 92 is folded up to form the four upstanding rod engagement portions 90 and 98. In order to increase the stiffness of the link element 90 and increase its resistance against deformation when the belt is under tension, the base portions 94 are formed e.g. by stamping, into a part-cylindrical upwardly convex channel shape 96 as shown in FIG. 12.

It will also be appreciated that although it is generally preferred that the outer ends of the rods 12 should be completely enclosed and embedded within the belts 11 as shown in FIG. 7, it is also possible that at least the end faces of the rods 12 could be exposed, whether the rod ends project outwardly of the belt edges, are substantially flush therewith, or slightly recessed therein.

What is claimed is:

1. An open web suitable for use in conveying bodies such as root crops and stones and clods, comprising at least two elongate belts extending parallel to each other in substantially spaced apart relation, a plurality of rods mounted in parallel spaced apart relation across said belts with connecting portions of said rods being substantially enclosed and embedded within the body of said belts, and tensile reinforcing means extending longitudinally in the body of at least one of said belts so as to provide a tensile load support therefor, wherein reinforcing link means is substantially embedded in at least one said belt having tensile reinforcing means embedded therein, said reinforcing link means being formed and arranged so as to link at least one of said rod connecting portions to said tensile reinforcing means whereby said tensile reinforcing means and said at least one rod connecting portion linked thereto are substantially restrained or retained against movement away from one another.

2. An open web according to claim 1 wherein the reinforcing link means is formed and arranged so as to captively link said at least one rod connecting portion to the tensile reinforcing means.

3. An open web according to claim 2 wherein said reinforcing means comprises a plurality of reinforcing links, each of said links being formed and arranged for captively linking a respective rod connecting portion to said tensile reinforcing means.

4. An open web according to claim 3 wherein the or each said reinforcing link has a first portion extending at least partly around a portion of said tensile reinforcing means, and at least one second portion extending at least partly around a connecting portion of a respective one of the rods.

5. An open web according to claim 3 wherein of at least one of said reinforcing links is formed and arranged for linking a plurality of said rod connecting portions to said tensile reinforcing means.

6. An open web according to claim 3 wherein the or each said reinforcing link is in the form of a generally staple-like element extending around a rod connecting portion and with its free ends fastened to said tensile reinforcing means.

7. An open web according to claim 4 wherein said reinforcing link(s) is (are) generally in the form of a twisted figure-of eight with said rod connecting portion and said tensile reinforcing means extending through respective loops of said link(s).

8. An open web according to claim 4 wherein is used a said reinforcing link comprising a base portion, and at least one, generally upstanding, rod engagement portion(s) each provided with an aperture or loop formed to receive therethrough a rod connecting portion, said base portion of the link extending below a portion of the tensile reinforcing means and a rod connecting portion extending through apertures or loops in the rod engagement portion(s) of the link above the tensile reinforcing means so that said tensile reinforcing means is sandwiched between the reinforcing means is sandwiched between the reinforcing link base portion and the rod connecting portion.

9. An open web according to claim 8 wherein said link has at least two spaced-apart, generally upstanding, rod engagement portions.

10. An open web according to claim 8 wherein the tensile reinforcing means comprises a plurality of spaced apart and/or separate strands or elements and wherein the reinforcing link has one or more rod engagement portions intermediate end portions of the link formed and arranged for penetrating said tensile reinforcing means between adjacent ones of said strands or elements.

11. An open web according to claim 8 wherein lower portions of each of said generally upstanding rod engagement portions are tapered inwardly to form a narrowed neck portion adjacent to said base portion.

12. An open web according to claim 3 wherein each said link comprises a single wire or strip bent into shape.

13. An open web according to claim 12 wherein each said link comprises a strip with at least one rod engagement portion aperture formed therein.

14. A method of manufacturing an open web suitable for use in conveying and separating bodies such as root crops and stones and clods, and comprising the steps of:

providing a plurality of elongate rods;

providing at least one elongate tensile reinforcing means;

linking at least one of said plurality of elongate rods to at least one said tensile reinforcing means using reinforcing link means, so that said at least one tensile reinforcing means and said at least one rod are substantially restrained or retained against movement away from one another;

supporting said plurality of rods so as to be in spaced apart parallel relation in an elongate array and arranging said at least one elongate tensile reinforcing means so as to extend transversely of said rods; and moulding at least two flexible elongate belts so as to extend in parallel spaced apart relation transversely of the rods and around connecting portions of the rods so as to embed said connecting portions of the rods, said reinforcing link means and said at least one tensile reinforcing means substantially within said belts.

15. A method according to claim 14 wherein there are provided at least two elongate tensile reinforcing means and said reinforcing link means is provided in the form of a plurality of pairs of reinforcing link elements, each link in a said pair being positioned so as to sandwich a portion of said tensile reinforcing means between a respective one of two rod connecting portions spaced apart longitudinally of one of said plurality of rods, prior to the moulding step taking place.

16. A method according to claim 14 which includes the steps of:

supporting a plurality of reinforcing link elements about respective portions of said at least one elongate tensile reinforcing means;

threading the connecting portions of at least some of said plurality of elongate rods through corresponding apertures or loops in said reinforcing link elements so as to sandwich said respective portions of the tensile reinforcing means between parts of the reinforcing link elements and the connecting portions of said rods, whereby said respective portions of the tensile reinforcing means are substantially held in position relative to said rod connecting portions; moulding said at least two flexible elongate belts so as to extend in parallel spaced apart relation transversely of the rods and around connecting portions of the rods, said reinforcing link elements and said at least one tensile reinforcing means, so as to substantially embed said tensile reinforcing means, said reinforcing link elements (32,34, 36,38) and said connecting portions of the rods within said belts.

* * * * *